US011151499B2

(12) United States Patent
Guven et al.

(10) Patent No.: US 11,151,499 B2
(45) Date of Patent: Oct. 19, 2021

(54) DISCOVERING LINKAGES BETWEEN CHANGES AND INCIDENTS IN INFORMATION TECHNOLOGY SYSTEMS

(71) Applicant: International Business Machines Corporation, Armonk, NY (US)

(72) Inventors: Sinem Guven, New York, NY (US); Karin Murthy, Bangalore (IN); Amitkumar M. Paradkar, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 14/979,095

(22) Filed: Dec. 22, 2015

(65) Prior Publication Data

US 2017/0178038 A1   Jun. 22, 2017

(51) Int. Cl.
*G06Q 10/06* (2012.01)
*G06Q 30/00* (2012.01)
(Continued)

(52) U.S. Cl.
CPC ....... *G06Q 10/0635* (2013.01); *G06Q 30/016* (2013.01); *G06F 8/71* (2013.01); *G06F 11/3051* (2013.01)

(58) Field of Classification Search
CPC ............... H04L 41/065; H04L 41/0645; H04L 43/0811; H04L 67/306; G06Q 10/0635; G06Q 10/063; G06Q 10/103; G06Q 10/06; G06Q 10/067; G06Q 30/016; G06N 7/005; G06N 5/025; G06F 11/079;
(Continued)

(56) References Cited

U.S. PATENT DOCUMENTS 6,076,088 A *  6/2000  Paik .................. G06F 16/367
7,246,229 B2   7/2007  Suermondt et al.
(Continued)

OTHER PUBLICATIONS

Stojanovic et al., "The development of World Oceans & Coasts and Concepts of Sustainability", T.A. Stojanovic and C.J.Q. Farmer, Center for Geoinformatics Department of Geography and Sustainable Development, University of St Andrews, 2013. (Year: 2013).*
(Continued)

*Primary Examiner* — Pan G Choy
(74) *Attorney, Agent, or Firm* — Kristofer Haggerty; Ryan, Mason & Lewis, LLP

(57) ABSTRACT

A method comprises obtaining, from a service management database, one or more change tickets and one or more incident tickets relating to an information technology infrastructure, extracting, from the change tickets and the incident tickets, one or more dimensions indicating potential causality between one or more changes and one or more incidents, identifying configuration items of the information technology infrastructure associated with the one or more changes and the one or more incidents, defining one or more linkages between the one or more changes and the one or more incidents, storing, in the service management database, the defined linkages, building a risk assessment model using the defined linkages, and monitoring subsequent changes to the information technology infrastructure using the risk assessment model.

20 Claims, 12 Drawing Sheets

(51) Int. Cl.
*G06F 8/71* (2018.01)
*G06F 11/30* (2006.01)

(58) Field of Classification Search
CPC ......... G06F 17/30705; G06F 17/30675; G06F 17/30719; G06F 17/3084; G06F 21/604; G06F 16/21; G06F 8/71; G06F 11/3051
USPC ........ 380/282; 705/7.13, 304; 707/706, 749; 709/204; 435/6.13
See application file for complete search history.

(56) References Cited

U.S. PATENT DOCUMENTS

| | | | |
|---|---|---|---|
| 7,987,146 B2 | 7/2011 | Shwartz et al. | |
| 8,301,613 B2 | 10/2012 | Grabarnik et al. | |
| 8,365,019 B2 | 1/2013 | Sailer et al. | |
| 8,799,436 B2 | 8/2014 | Ayachitula et al. | |
| 2002/0034305 A1* | 3/2002 | Noyama | H04L 9/3213 380/282 |
| 2005/0097396 A1 | 5/2005 | Wood | |
| 2007/0022000 A1 | 1/2007 | Bodart et al. | |
| 2007/0100712 A1 | 5/2007 | Kilpatrick et al. | |
| 2007/0196851 A1* | 8/2007 | Yakovlev | G06F 19/24 435/6.13 |
| 2008/0010330 A1* | 1/2008 | Ide | G05B 23/024 708/201 |
| 2009/0063387 A1 | 3/2009 | Beaty et al. | |
| 2009/0171730 A1* | 7/2009 | Bobak | G06Q 50/188 705/80 |
| 2009/0276403 A1* | 11/2009 | Tamayo | G06F 16/2465 |
| 2010/0131315 A1 | 5/2010 | Gilbert et al. | |
| 2010/0274616 A1* | 10/2010 | Grace | G06Q 10/063 705/7.11 |
| 2012/0102050 A1* | 4/2012 | Button | G06F 17/30867 707/749 |
| 2013/0212170 A1* | 8/2013 | Chung | G06Q 10/10 709/204 |
| 2014/0052644 A1* | 2/2014 | Ott | G06Q 10/10 705/304 |
| 2014/0129536 A1* | 5/2014 | Anand | G06N 7/005 707/706 |
| 2014/0207504 A1* | 7/2014 | Katircioglu | G06Q 10/06311 705/7.13 |
| 2014/0324374 A1* | 10/2014 | Kim | G05B 17/02 702/83 |
| 2015/0294246 A1* | 10/2015 | Kaya | G06Q 10/06393 705/7.28 |
| 2016/0337210 A1* | 11/2016 | Koplin | H04L 41/5074 |

OTHER PUBLICATIONS

R. Gupta et al., "Automating ITSM Incident Management Process," IEEE International Conference on Autonomic Computing (ICAC), Jun. 1008, pp. 141-150.

S. Güven et al., "Change Risk Expert: Leveraging Advanced Classification and Risk Management Techniques for Systematic Change Failure Reduction," IEEE Network Operations and Management Symposium (NOMS), Apr. 2012, pp. 795-809, Maui, Hawaii.

S. Hagen et al., "Efficient Verification of IT Change Operations or: How We Could Have Prevented Amazon's Cloud Outage," IEEE Network Operations Management Symposium (NOMS), Apr. 2012, pp. 368-376, Maui, Hawaii.

J.W. Branch et al., "BizMap: A Framework for Mapping Business Applications to IT Infrastructure," IFIP/IEEE International Symposium on Integrated Network Management (IM), May 2015, pp. 1377-1383, Ottawa, Ontario, Canada.

U.S. Appl. No. 14/978,710 filed in the name of Sinem Guven et al., filed Dec. 22, 2015 and entitled "Automated Change Monitoring and Improvement Recommendation System for Incident Reduction in Information Technology Infrastructure."

A. Medem et al., "TroubleMiner: Mining Network Trouble Tickets," IFIP/IEEE International Symposium on Integrated Network Management-Workshops (IM), Jun. 2009, pp. 113-119.

L. Tang et al., "Identifying Missed Monitoring Alerts Based on Unstructured Incident Tickets," 9th International Conference on Network and Service Management (CNSM), Oct. 2013, pp. 143-146, Zurich, Germany.

I. Rish et al., "Adaptive Diagnosis in Distributed Systems," IEEE Transactions on Neural Networks, Sep. 2005, pp. 1088-1109, vol. 16, No. 5.

L. Shwartz et al., "Quality of IT Service Delivery—Analysis and Framework for Human Error Prevention," IEEE International Conference on Service-Oriented Computing and Applications (SOCA), Dec. 2010, pp. 1-8.

D. Scott, "Best Practices for Continuous Application Availability," Gartner IT Security Summit 2005, Jun. 2005, 21 pages.

J. Druebert, "Changes, Incidents & Uninteded Consequences," ITSM Watch, http://www.itsmwatch.com/itil/article.php/3866396/Changes-Incidents--Unintended-Consequences.htm, Feb. 22, 2010, 3 pages.

L. Tang et al., "Recommending Resolutions for Problems Identified by Monitoring," IFIP/IEEE International Symposium on Integrated Network Management (IM 2013), May 2013, 9 pages.

J. Bogojeska et al., "Classifying Server Behavior and Predicting Impact of Modernization Actions," 9th International Conference on Network and Service Management (CNSM), Oct. 2013, pp. 59-66.

S. Agarwal et al., "SmartDispatch: Enabling Efficient Ticket Dispatch in an IT Service Environment," Proceedings of the 18th ACM SIGKDD International Conference on Knowledge Discovery and Data Mining, Aug. 2012, pp. 1393-1401.

L. Tang et al., Optimizing System Monitoring Configurations for Non-Actionable Alerts, IEEE Network Operations and Management Symposium (NOMS), Apr. 2012, 9 pages.

The Stanford Natural Language Processing Group, "The Standford Parser: A Statistical Parser," http://nlp.stanford.edu/software/lex-parser.shtml, 2015, 6 pages.

* cited by examiner

| VERB | NOUN SEQUENCE |
|---|---|
| REMEDIATE | AIX OS VIOLATION |
| FORM | IBM CITRIX SERVER OS |
| FORM | CITRIX SERVER OS NEED |
| DATER | DOMAIN OS |
| FIND | OS FILESYSTEMS |
| BUILD | IBM CITRIX SERVER OS |

FIG. 7

| FACTORS | TEST CASES = 100 (WITH 5 RESULTS) | % OF TOP RESULT CORRECT |
|---|---|---|
| TIME | 52% | 30% |

702

| FACTORS | TEST CASES = 100 (WITH 5 RESULTS) | % OF TOP RESULT CORRECT |
|---|---|---|
| ALL DIMENSIONS | 67% | 51% |

704

| SAME ENTITY ACTION | CH → IN = T Freq | CH → IN = F Freq |
|---|---|---|
| T | 20% | 25% |
| F | 80% | 75% |

706

| FACTORS | TEST CASES = 100 (WITH 5 RESULTS) | TEST CASES = 100 (WITH 4 RESULTS) | TEST CASES = 100 (WITH 3 RESULTS) | % OF TOP RESULT CORRECT |
|---|---|---|---|---|
| TIME | 52% | 45% | 42% | 30% |
| ALL DIMENSIONS | 67% | 64% | 61% | 51% |
| SIGNIFICANT DIMENSIONS | 75% | 71% | 70% | 58% |

708

800

DISCOVERING LINKAGES BETWEEN CHANGES AND INCIDENTS IN INFORMATION TECHNOLOGY SYSTEMS

BACKGROUND

The present invention relates to information technology, and more specifically, to techniques for managing changes to information technology infrastructure. Linking information technology service incident tickets to relevant information technology change tickets, or more generally linking incidents to changes, is a manual task that is prone to error and often neglected due to time constraints. As such, it is difficult to gather sufficient historical data for retrospective analysis and future incident prevention.

SUMMARY

Embodiments of the invention provide techniques for defining linkages between service related changes and incidents in information technology systems.

For example, in one embodiment, a method comprises obtaining, from a service management database, one or more change tickets and one or more incident tickets relating to an information technology infrastructure, extracting, from the change tickets and the incident tickets, one or more dimensions indicating potential causality between one or more changes and one or more incidents, identifying configuration items of the information technology infrastructure associated with the one or more changes and the one or more incidents, defining one or more linkages between the one or more changes and the one or more incidents, storing, in the service management database, the defined linkages, building a risk assessment model using the defined linkages, and monitoring subsequent changes to the information technology infrastructure using the risk assessment model. The method is performed by at least one processing device coupled to the information technology infrastructure over at least one network.

BRIEF DESCRIPTION OF THE DRAWINGS

FIG. 5 depicts an example of identifying entity-action pairs in change and incident tickets, according to an embodiment of the present invention.

FIG. 7 depicts examples of determining contributing dimensions for identifying entity-action pairs, according to an embodiment of the present invention.

DETAILED DESCRIPTION

Figure 1:
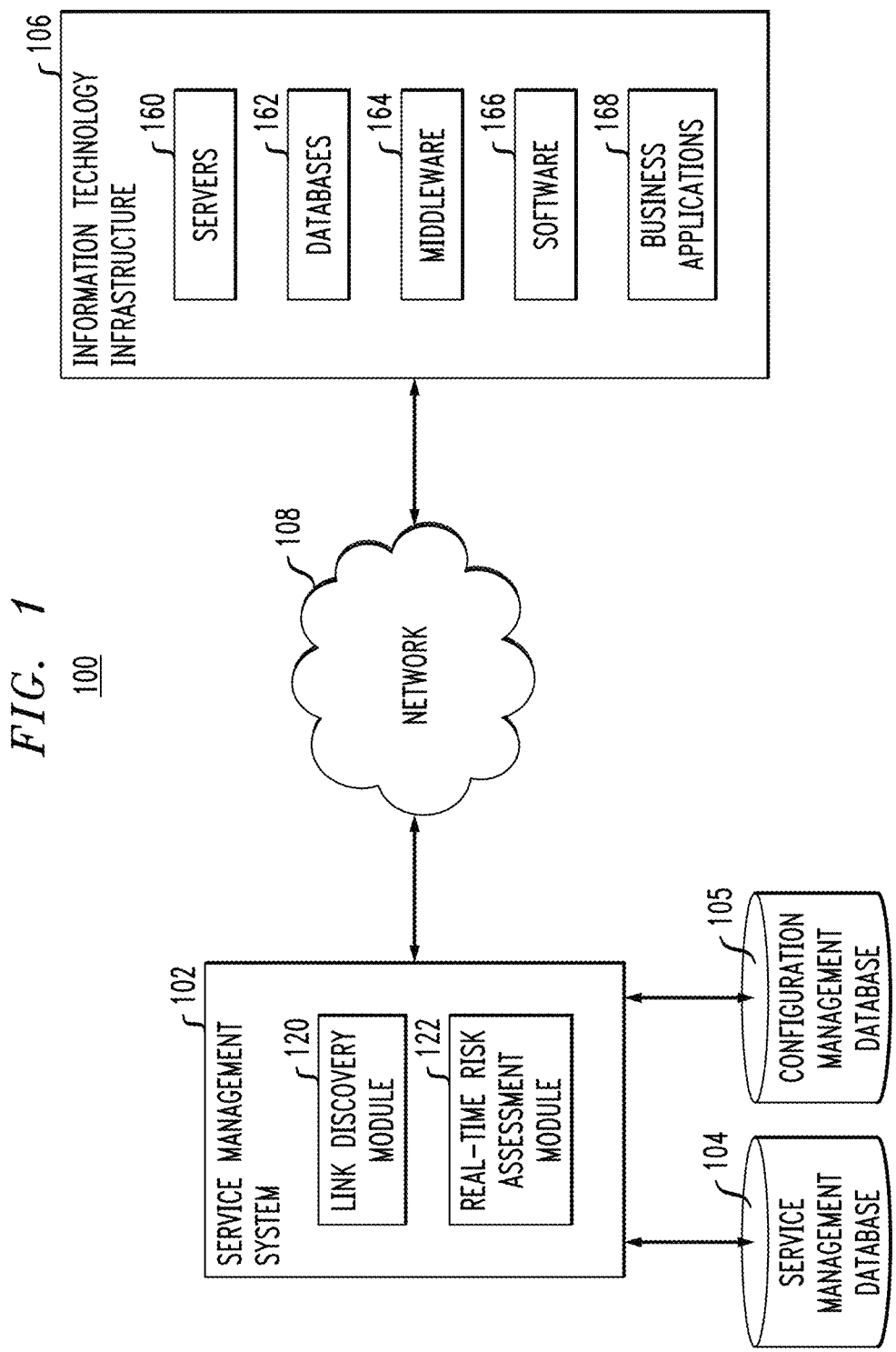
FIG. 1 depicts a system for defining linkages between changes and incidents in information technology infrastructure, according to an embodiment of the present invention.

Illustrative embodiments of the invention may be described herein in the context of illustrative methods, systems and devices for defining linkages between changes and incidents in information technology (IT) infrastructure. However, it is to be understood that embodiments of the invention are not limited to the illustrative methods, systems and devices but instead are more broadly applicable to other suitable methods, systems and devices.

As discussed above, linking incidents to changes is typically a manual task prone to error and often neglected due to time constraints. In the IT service domain, changes to system configuration are responsible for a major portion of the incidents that result in client outages. However, it is typically very difficult to establish a relationship between changes and incidents as proper documentation takes lower priority at change creation time as well as during incident management in order to deal with the tremendous time pressure to quickly implement changes and resolve incidents. As a result, it is often not possible to leverage historical data to perform retrospective analysis to identify any emerging trends linking changes to incidents, or to build predictive models for proactive incident prevention at change creation time.

Various embodiments of the invention address these and other issues with conventional change and incident management systems. For example, some embodiments facilitate retrospective analysis. Once changes are linked to relevant incidents, subject matter experts (SMEs) can use such information to perform retrospective analysis of what types of changes typically lead to incidents to establish trends relating to problematic changes, which may not be immediately apparent from looking at incident tickets.

As another example, some embodiments provide for future problem or incident prediction. Once significant trends emerge from retrospective analysis, SMEs can build predictive models to proactively determine the risk for a given new change. This risk may indicate whether the given new change is likely to succeed or fail, or lead to an incident based on historical data. Determining the risk may also include identifying potentially affected business applications, underlying servers, middleware or other configuration items in IT infrastructure resulting from the given new change.

As a further example, some embodiments provide for automation. Understanding the relationships between changes and incidents can help with decisions about which changes are typically non-problematic and thus are candidates for automated execution.

Different embodiments may provide any combination of the above advantages, as well as other advantages and features described herein in addition to or as an alternative to the above-described advantages. Some embodiments provide techniques for establishing causality between changes and incidents using statistics, data classification and natural language processing techniques.

Incident management is an important pillar of IT service management. Incidents, also referred to herein as service disruptions, can vary in impact. Some service disruptions may result in a major outage, grounding an entire company to a standstill. Other service disruptions may be relatively trivial, such as a monitoring incident alerting system administrators to a quickly filling up hard disk on a server machine. A significant problem IT service providers face is that a large proportion, approximately 80%, of incidents that result in client outages are caused by changes to configuration items in IT infrastructure. Despite the magnitude of this problem, it is very difficult to collect data for such outage events for future incident prevention due to the tremendous time pressure to quickly implement changes and resolve incidents.

Root cause analysis (RCA) is a valuable source of information for linking incidents to changes. RCAs, however, are typically only available for major outages due to the amount of effort that is required to conduct a detailed RCA. Further, due to the great amount of detail in RCAs, most of which is based on unstructured text, it is difficult to mine RCAs for automated change-to-incident (CH→IN) link discovery.

Another important aspect of an effective change management process is risk management, which aims to assess and mitigate change risk to reduce the chance of failure or eventual outage. While tracking failed changes leading to incidents is feasible through a well-orchestrated risk management process, in some cases seemingly successful changes lead to incidents. In the absence of historical data that links changes, including seemingly successful changes, to resulting incidents it becomes difficult or impossible to assess the true risk of a change at change creation time. This is due in part to the inability to take into account the likelihood of causing an incident based on historic similar change performance. The more complex an IT system, the more difficult it becomes to estimate the effect of a change and keep track of its impact.

As discussed above, the relationship between changes and incidents is hard to establish using conventional techniques. Incident analytics may be used to recommend resolutions for problems identified by monitoring, to classify server behavior to predict the impact of modernization actions and to efficiently dispatch incident tickets in an IT service environment. Similarly, change analytics has been used for change risk management and to prevent changes from causing incidents by detecting conflicts among IT change operations and safety constraints. These approaches, however, do not adequately address the problem of linking changes to incidents in various domains.

FIG. 1 illustrates a network system 100 for defining linkages between changes and incidents in IT infrastructure 106. The system 100 includes a service management system 102 coupled to a service management database (SMDB) 104. The service management system 102 is also coupled to IT infrastructure 106 over network 108. The network 108 may be any one of or combination of different network types. While FIG. 1 also shows the service management system 102 coupled to a separate configuration management database (CMDB) 105, embodiments are not limited to arrangements wherein the SMDB 104 and CMDB 105 are separate. In some embodiments, for example, the SMDB 104 may itself include the CMDB 105 or vice-versa. In addition, in some embodiments the service management system 102 is not necessarily coupled to both a SMDB 104 and a CMDB 105. One or both of the SMDB 104 and CMDB 105 may be implemented internal to the service management system 102 rather than external to the service management system 102.

The IT infrastructure 106 includes a number of servers 160, databases 162, middleware 164, software 166, business applications 168 and possible other types of configuration items (CIs) not specifically shown.

The service management system 102 implements a link discovery module 120 and real-time risk assessment module 122. The link discovery module 120 is configured to define linkages between changes and incidents using change and incident data from SMDB 104. These linkages are used by real-time risk assessment module 122 to build a risk assessment model used in monitoring subsequent changes to CIs in the IT infrastructure.

Figure 2:
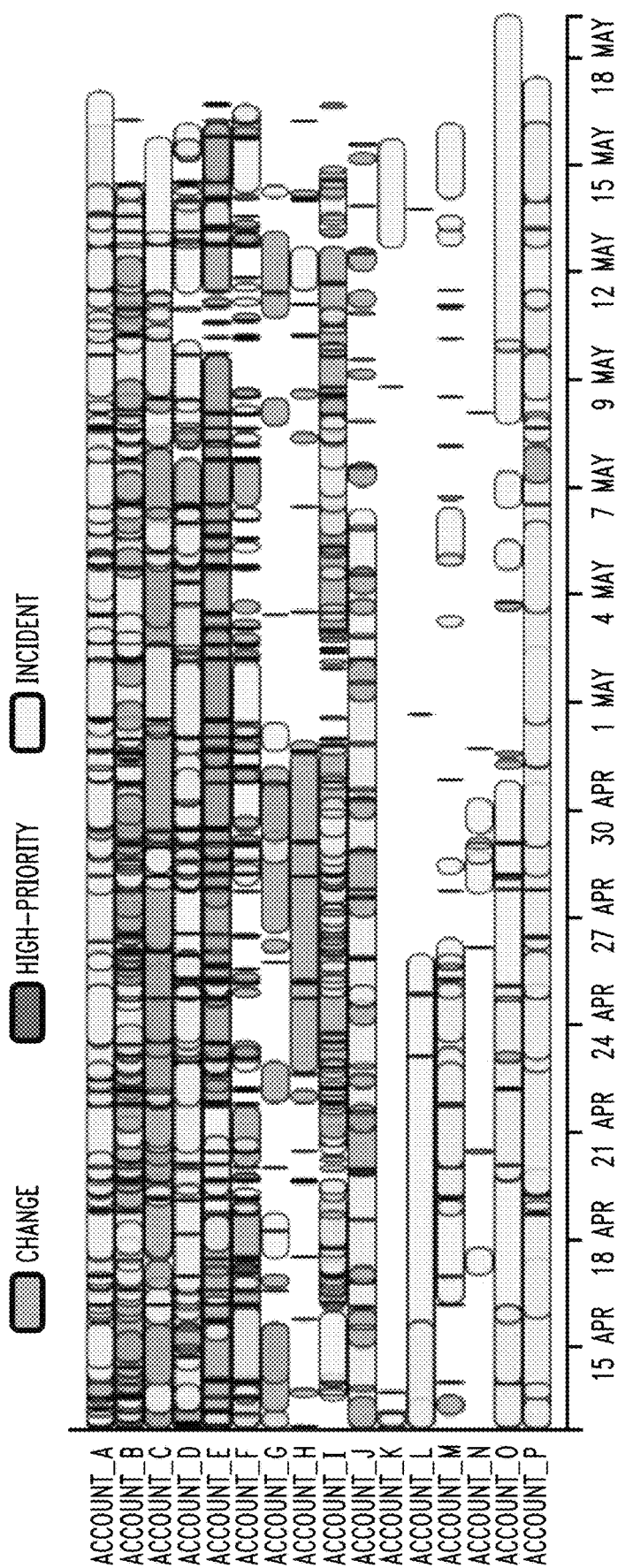
FIG. 2 depicts an example of changes and incidents for a set of accounts over a period of time, according to an embodiment of the present invention.

FIG. 2 depicts a chart 200 showing changes and incidents for a set of accounts denoted Account A through Account P over a one-month timeframe. As evident from chart 200, there may be hundreds of changes, and zero or more incidents happening for each of the accounts. In order to leverage change and incident data for incident prevention, it is advantageous to at least semi-automatically link the incidents to changes that caused them, as manual exploration would be fairly time consuming and often fruitless.

Figure 3:
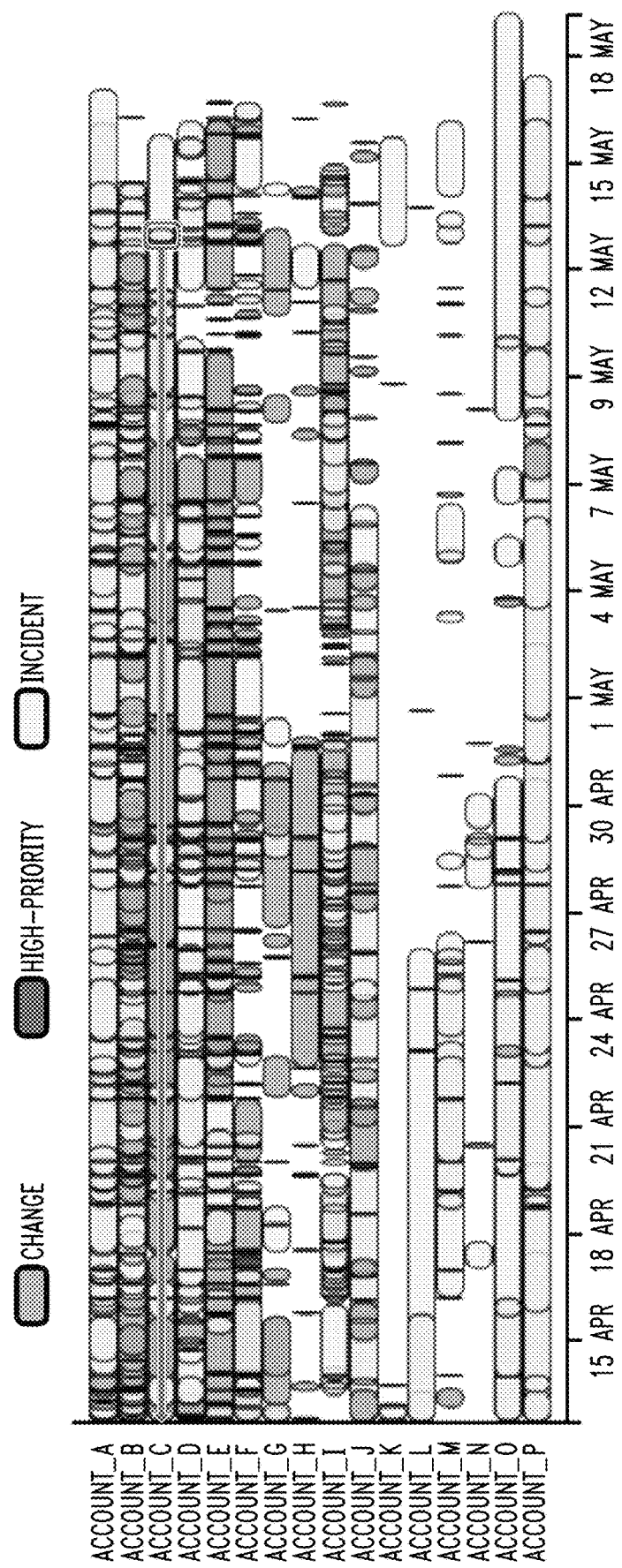
FIG. 3 depicts an example of linking an incident to a change for an account, according to an embodiment of the present invention.

FIG. 3 depicts a chart 300, showing a mapping of a particular incident in Account C to the change that caused it. As shown in FIG. 3, the change causing the particular incident occurred several weeks before the incident. In addition, there are various other intervening changes between occurrence of the change causing the incident and the incident itself. This illustrates how various factors, such as time, affect the CH→IN linking.

Of course, only a change that happened prior to a given incident can be responsible for the given incident. Unfortunately, not all incidents arise immediately after a change takes place, and in some cases many seemingly successful changes can be applied before the given incident occurs. Thus, it is not always simple to link changes and incidents based on time alone.

For CIs such as business applications, the topology of such business applications can provide insight for linking changes to incidents. A business application outage, for example, will typically only be caused by changes to the IT infrastructure supporting the application. As such, the search space can be limited to changes performed on the application itself as well as other CIs supporting the application, such as underlying hardware, middleware, etc.

The technical details associated with changes and incidents may also be analyzed for factors or dimensions used to link changes and incidents. A change description will generally mention an entity for which an action is performed, e.g., applying a patch to an operating system (OS), increasing space on a disk drive, upgrading a database version, restarting a server, etc. Incident data, such as incident tickets, incident resolution text, chronology logs, RCA, etc., for a given incident are also likely to mention the same entity-action pair as the change that caused the given incident. Change and incident data, such as change and incident tickets or other records, may also contain structured metadata that can be leveraged to further strengthen the link between changes and incidents. For example, changes classified as storage may be related to incidents classified as storage capacity errors.

Change data describes various change attributes. Change attributes may include one or more of summary, detailed description, start and/or end time, type, priority, owner group, implementation steps, verification plan, backout plan, approvers and outcome (e.g., success, fail, backout). Various other attributes may be used in change data, and change data such as a change ticket need not necessarily include all of the above-described attributes. Although the outcome attribute appears to be useful, there are various issues with relying on this attribute alone to determine whether a change led to an incident or not as even successful changes may lead to incidents.

A change request outcome attribute is often determined at the time of change closing, which means that it only reflects the correct information for failed or backed out changes, but not necessarily for successful changes. In other words, relying solely on the outcome attribute to link changes and incidents is not enough as there are seemingly successful changes which complete as designed but lead to an incident later on. As an example, consider a patch that is successfully applied to software. Once the change is applied, its outcome attribute may be set to success. The software, however, may later misbehave or otherwise cause an incident because of the patch. Relying on the outcome attribute of the change ticket alone, however, will not capture that the seemingly successful software patch resulted in an incident. As another example, backout changes, although backed out by design, may leave some residual risk that can lead to an incident in the future. The outcome attribute in such cases fails to capture this risk and therefore does not prove to be a good indicator of whether certain changes led to incidents or not.

Another problem with using failed changes to investigate incident causality is that failed changes are typically very small in number. Failed changes causing incidents are thus even smaller, which makes them non-ideal for incident causality analysis. Some embodiments focus particularly on successful changes for defining linkages between changes and incidents. Embodiments, however, may also take into account failed or backout changes as well.

Incident data, such as incident tickets, can also include a number of attributes. Incident attributes may include, by way of example, description, start and/or end time, type, severity, resolver group, resolution, etc. Certain major incidents may also have RCAs, which explain the path to the incident in detail as well as lessons learned for future incident prevention. While RCAs are typically the best source of information for determining change and incident causality, the unstructured nature of RCAs makes it difficult to use RCAs without having to invest in deep natural language processing (NLP) techniques geared towards service management domains.

Incident resolutions describe what was done to fix a problem or incident, and as part of this narrative often mention what the problem was. Similar to RCAs, incident resolutions are mainly unstructured text. Unlike RCAs, incident resolutions are often much more precise and to the point due to the time pressure under which incident resolutions are created. Further, because RCAs are typically conducted only for major incidents, the RCA data set is much smaller than incident resolutions, which are created for every incident no matter how big or small. For that reason, some embodiments focus on incident resolutions as the main data source. Embodiments, however, can supplement incident resolutions with RCA data whenever an incident has an RCA conducted.

Data relating to the IT infrastructure such as the various CIs of IT infrastructure 106, is commonly used to maintain a current picture of the IT infrastructure used to deliver services. Each CI is a unit that describes an item involved in a service delivery process. Examples of CIs include servers 160, databases 162, middleware 164, software 166 and business applications 168. The CMDB 105 inventories and manages the lifecycles of the CIs in IT infrastructure 106.

Typically, changes and incidents are related to one or more CIs. For example, a change may apply to a software product ($CI_1$) installed on a specific server ($CI_2$) in order to ensure that a specific business application ($CI_3$) runs smoothly. Similarly, a reported incident may state that a specific database ($CI_4$) hosted on server ($CI_2$) is not responding. There may be an overlap between CIs affected by a change and CIs related to an incident. For example, the aforementioned change and incident are both related to the same server ($CI_2$). A change affecting a given CI is more likely to cause an incident for that CI than a different CI.

Before analyzing change, incident and configuration data, the link discovery module 120 may perform various data discovery and cleanup processes. Data discovery and cleanup may be designed so as to gather as much relevant information as possible about incidents and changes for the investigation of change and incident causality.

Data discovery and cleanup may include false incident ticket elimination. False incident tickets are tickets that wrongly report an incident. Whether an incident ticket is a false ticket or not can usually be determined by the resolution message entered into an incident-tracking database such as SMDB 104 by a system administrator stating that nothing needed to be done to resolve the incident (or other similar language). Certain categories of alerts or incidents, such as CPU or paging utilization alerts, may be almost exclusively false tickets. By analyzing resolution messages in detail, a SME can identify the reasons behind false tickets. For example, antivirus programs or processes may cause prolonged CPU spikes at regular intervals, databases may reserve large amounts of disk space in advance resulting in the false impression that a system is running out of storage, etc.

Many false alerts, such as CPU spikes or server reboots, are transient alerts that automatically disappear after time. The incident tickets for such false alerts, however, remain in the ticketing system and possibly SMDB 104. Resolution messages for such tickets show that, when system administrators opened tickets and logged on to the server, they were unable to find the problem described by the tickets. As such, false tickets, which usually repeat in large numbers until they are identified and closed, pose a threat to the quality of any analysis or predictive models built using incident data.

Various algorithms may be used for reducing the number of false tickets while preserving tickets useful to the link discovery module 120. In some embodiments, usage-specific rules may be discovered and used to filter out false tickets. Examples of usage-specific rules include: anti-virus programs cause CPU spikes, databases reserve disk space, paging utilization alerts are only real beyond a certain threshold, etc. Correct detection of false tickets using such techniques approaches 75%, and such techniques may be used in data cleanup processes utilized by link discovery module 120 to reduce bias resulting from repeating false tickets.

Many structured fields exist in change and incident data. In some embodiments, the link discovery module 120 eliminates certain structured fields that are mostly blank or have the same data. Examples of useful structured fields for change data and incident data are provided below. It is to be appreciated, however, that in certain embodiments various other structured data fields in change and incident data may be utilized. Useful structured fields for change data include, but are not limited to, start time, priority, type and owner group. Useful structured fields for incident data include, but are not limited to, summary, detailed description, resolution, start time, severity, type and resolver group.

Change and incident data can also include various unstructured fields. The link discovery module 120 may similarly eliminate certain sparsely populated unstructured fields during data discovery and cleanup. Unstructured change data and unstructured incident data are also referred to herein as change text and incident text, respectively. Examples of useful unstructured fields for change text include summary and detailed description. Examples of useful unstructured fields for incident text include summary, detailed description and resolution. Embodiments, however, are not limited solely to use with these unstructured fields.

Various techniques may be used to analyze unstructured fields of change and incident data. In some cases, incident resolutions mention the change that led to the incident. This valuable information is extracted and used as ground truths for testing the accuracy of CH→IN linkages defined by link discovery module 120. Regular expression patterns and parsing of incident text, possibly through the use of Java, may be used to extract mentioned changes from incident data. Although in some cases incident resolutions mention the change that led to an incident, these cases typically represent a small minority of all incident data. As such, various techniques such as discovering (entity, action) or entity-action pairs and utilizing common words analysis may be utilized.

Given the length and complexity of unstructured fields, (entity, action) pairs may be extracted from change and incident text for use in defining linkages between changes and incidents. In some embodiments, (entity, action) pairs act as a classification as well as a summary of the change for a relatively easier comparison to unstructured incident description and resolution. An example of discovering an (entity, action) pair is described below. Consider an incident resolution which states "[Prod] After change rebooted the server CMT01NAX1 with success, we found the following error event on DC's that was impacted. The server was unable to allocate from the system . . . " The change (entity, action) pair for this incident resolution may be (server CMT01NAX1, reboot). To extract (entity, action) pairs, various NLP parsers may be used. For example, noun phrases may be identified and mapped to entities. Once noun phrases are identified, verbs associated with the noun phrases are identified. A top ranked pair among multiple pairs may be selected.

Figure 4:
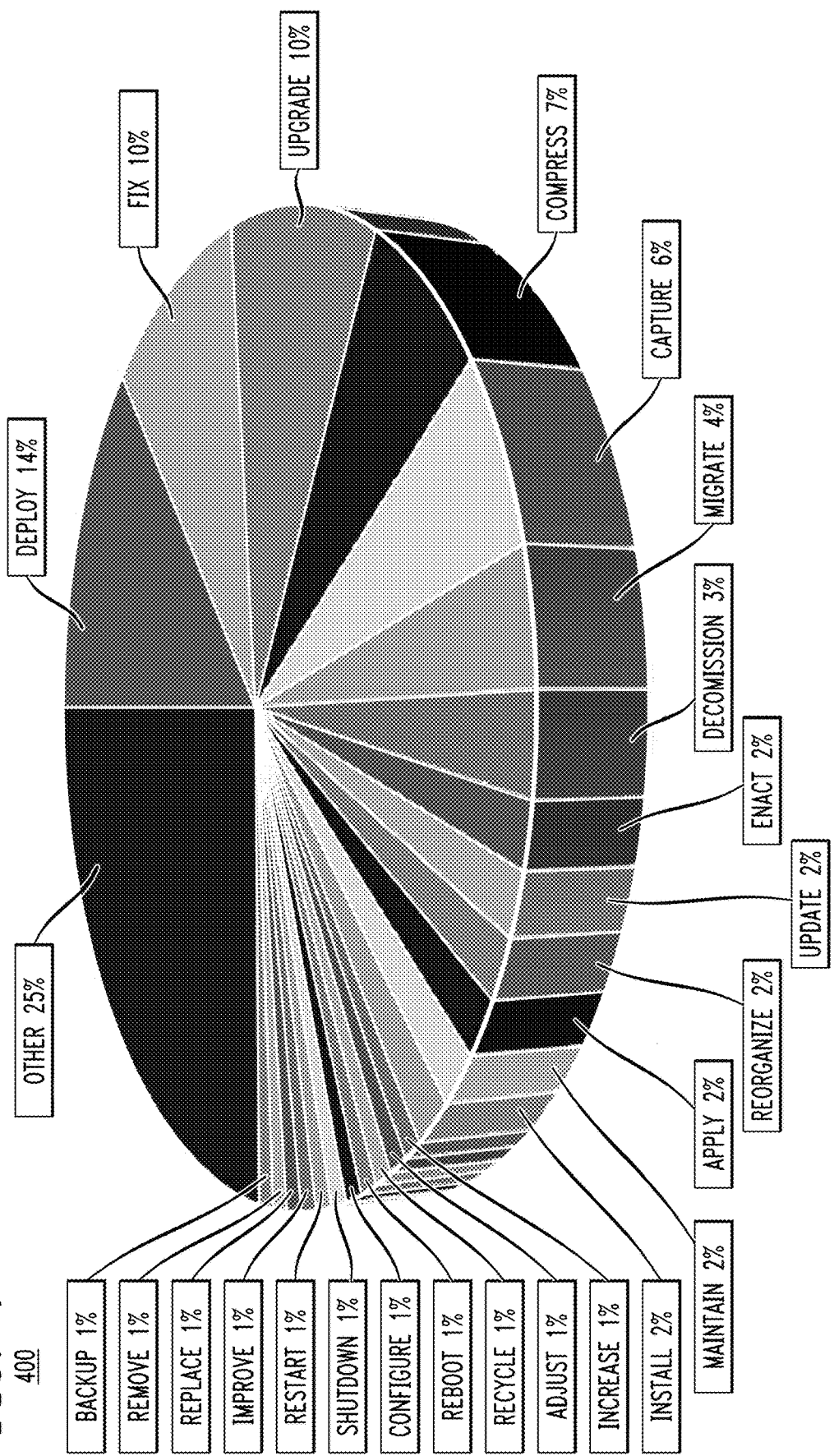
FIG. 4 depicts a pie chart of various change actions resulting in incidents for an account, according to an embodiment of the present invention.

FIG. 4 shows a pie chart 400 of sample actions extracted from approximately 650 change tickets that led to incidents for a given account. Entities are not shown in FIG. 4 for clarity.

FIG. 5 shows a table 500 which may be used for identifying (entity, action) pairs. The table 500 includes columns for verbs and noun sequences. In some embodiments, (entity, action) pairing relates entities and actions if they co-occur within a description such as within a particular structured or unstructured field of change or incident data. Such relationships are filtered by correlation and frequency scores. Only pairs with high correlation scores and frequency between a minimum and maximum are maintained. The minimum requires pairs to appear more often, while the maximum ensures that pairs are specific to exclude certain non-useful generic entity actions. In some embodiments, domain dictionaries are used to filter pairs to keep only those pairs that contain domain-specific entities and actions. Domain ontologies and lexical databases such as WordNet may be used to handle synonyms for entities and actions.

Common words analysis may also be used by the link discovery module 120 in data discovery and cleanup. Although (entity, action) pairs can be very definitive in connecting changes to incidents when the change (entity, action) is present in incident text, the free-from nature of change and incident text means that it is unlikely for an exact change entity to be present in incident text. Consider, as an example, the entity "application server memory parameters" and the action "adjust." If the link discovery module 120 were to rely on the (entity, action) pair alone to link an incident to a change, unless the entity "application server memory parameters" appears in the incident text in its entirety, there will not be a match. Some meaningful substring of the entity such as "application server" or "memory parameters" may be sufficient to link the change to an incident. As such, the link discovery module 120 can determine the number of common words between change text and incident text as another indicator of connection between changes and incidents.

The link discovery module 120 may also discover CIs during data discovery and cleanup. In some relatively rare cases, a structured field may describe the CIs affected by an incident or change. However, it is more common that a system administrator or other user or entity creating an incident or change ticket will not call out the CI in a separate structured field, but simply mention it as part of the change or incident text. Thus, text matching may be employed to identify CIs associated with a change or incident. To do this text matching, an inventory of all CIs is used. The CMDB 105 may provide this inventory. Alternatively, one or more tables, spreadsheets or other sources may be used to form the inventory of CIs.

In order to identify which CIs are mentioned in change or incident text, types of CI descriptors commonly used in change and incident text are identified. For example, system administrators may not use fully qualified domain names when mentioning a server but instead simply use a server's name. While identifying a server by its name may not always yield 100% precision, due to an account using the same server name within different domains for instance, server name may achieve very high recall justifying a small drop in precision. Similarly, for business application CIs, system administrators usually use either an application short name or an associated application code when mentioning the business application. For databases and middleware, two pieces of information are typically required to identify a CI, e.g., for a database the text generally needs to contain the database name as well as the name of the server on which the database resides.

CI description types are used to match respective CI descriptions against unstructured fields of incident and change data to identify one or more CIs linked to incidents and changes, respectively. In some embodiments, only exact matches are used as fuzzy matching may yield too many false positives. However, in other embodiments fuzzy matching may be used so as to identify CIs with spelling errors or uncommon abbreviations. Links are stored for later use, possibly in the SMDB 104 or CMDB 105.

Figure 6:
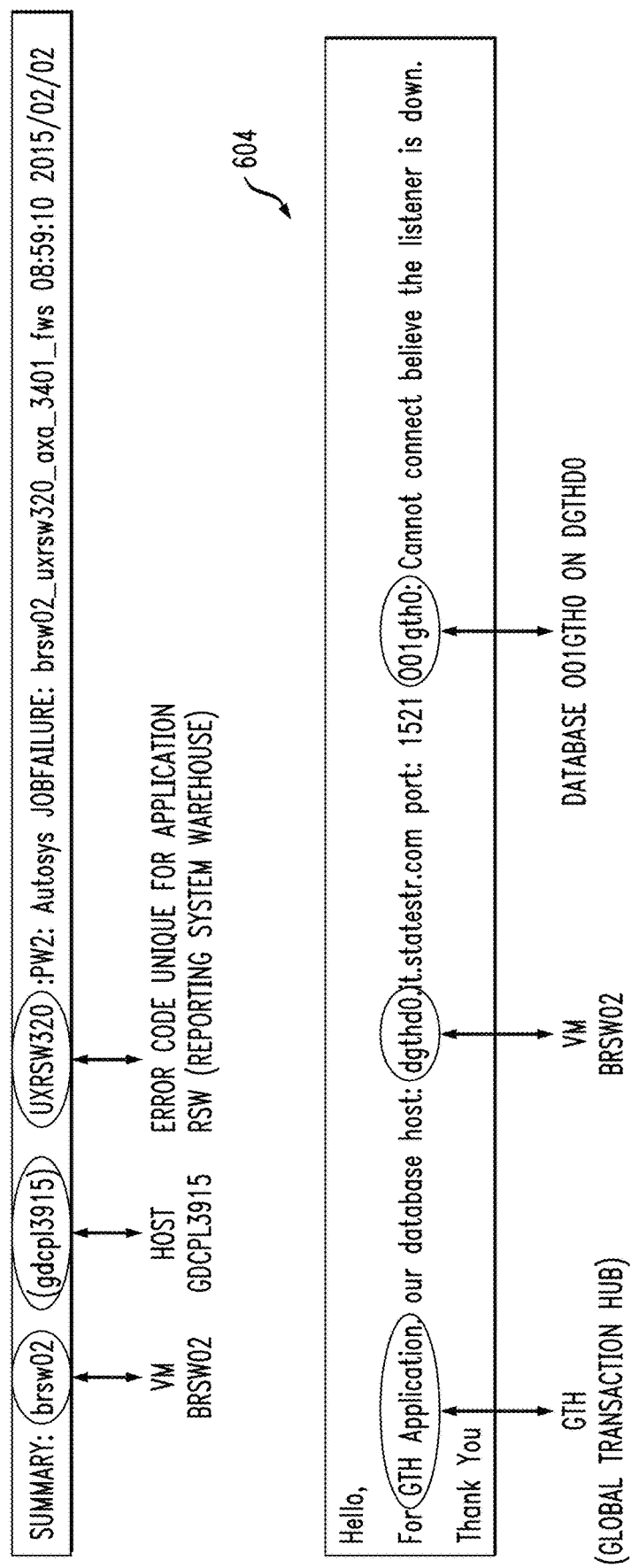
FIG. 6 depicts examples of identifying configuration items in change and incident tickets, according to an embodiment of the present invention.

FIG. 6 shows two examples of identifying CIs from change and incident text. As mentioned above, CI inventory data in some form is assumed to be available. For each CI, one or more keys are identified. A key is information that is enough to uniquely identify a CI. For a server, the key may be a fully qualified domain name (FQDN). For a business application, the key may be an error code unique to the application. For a database, the key may be a combination of the database name, the database instance name and the hostname. In some embodiments, keys that are not necessarily unique to one CI may be used to increase recall. For a server, a non-unique key may be the hostname. For a business application, a non-unique key may be the application name. For a database, a non-unique key may be a combination of the database name and the hostname.

After identifying the keys for CIs, the keys are matched to ticket text. If a key appears in the ticket text in any structured or unstructured ticket field, the ticket may be linked to the CI associated with the key. For some keys, additional constraints may be used. As an example, an application mnemonic should be followed by application. FIG. 6 shows a summary field 602 of change or incident data. From the summary field 602, virtual machine BRSW02 is identified, Host GDCPL3915 is identified, and the Reporting System Warehouse (RSW) business application is identified based on the error code unique for the application. FIG. 6 also shows unstructured text of change or incident data 604. From the unstructured text 604, Global Transaction Hub (GTH) business application is identified, virtual machine BRSW02 is identified and database O01GTH0 on DGTHD0 is identified.

Link discovery module 120, after data discovery and cleanup, may determine a number of dimensions that are potential indicators of causality between changes and incidents. Temporal dimensions are one type of dimension that potentially indicates causality between changes and incidents. Certain common structured fields, such as owner group, type, priority and CI are also dimensions that potentially indicate causality between changes and incidents. There are also dimensions discovered from unstructured fields, such as (entity, action) pairs and common words, which may indicate causality between changes and incidents. Certain examples of such dimensions are described below:

Time: time elapsed between a change and an incident;

SameCI: whether a change and an incident happened on or are otherwise associated with the same CI, e.g., server XYZ;

SameType: whether a change and an incident have the same type, e.g., DB2 instance;

SameGroup: whether the change owner group is the same as the incident resolver group;

SameImpact: whether the change risk is the same as the incident risk;

SameEntityAction: whether the change (entity, action) pair exists in incident text; and NumberCommonWords: the number of common words between change and incident text.

It is to be appreciated that embodiments are not limited solely to the specific examples described above. In other embodiments, various other dimensions may be used.

After data discovery and cleanup, the link discovery module 120 determines how each potential dimension contributes to CH→IN linkages. A general approach includes first discovering some known CH→IN pairs as well as a set of changes that did not lead to an incident (CH→IN) to collectively act as ground truths. Next, pairs are discovered through dimension similarity between changes and incidents. Those pairs are then compared against the ground truths.

Pair discovery may involve scanning change and incident text against CI inventory. In some embodiments, inexplicit CIs need to be identified through short names and associated applications. Part-of-speech (POS) tags and parse dependencies are used to extract relevant information for (entity, action) pairs. In some embodiments, synonyms and misspellings are considered. In addition, domain specific terminology may be considered. Pair discovery in some embodiments also includes checking for common words between change and incident tickets, excluding noise such as prepositions, numbers and time information, but considering plurals, stemming, etc.

The explicit mention of changes in incident records is a starting point for determining ground truths. Unfortunately, the majority of the time when a change leads to an incident this causality is not documented in the incident ticket or other data as an explicit mention. This typically results in only a small set of (CH→IN) pairs for use as ground truths. Additionally, not every explicit mention is reliable on its own, as the incident ticket may refer to changes that are spawned as a result of an incident, or to other changes that were co-running at the time of the incident. Thus, in building the set of CH→IN pairs based on explicit mentions, temporal dimensions may be utilized to filter out pairs where the changed happened after the incident and thus could not have caused the incident. Even after such temporal filtering, however, further verification may be needed to filter out other false positives. Thus, the link discovery module 120 may look for cues in unstructured text that mention that an incident was "caused by a change" or "due to a change" or other similar cues. Such cues from unstructured text prove to be definitive when combined with explicit mentions and temporal filtering to build a set of CH→IN linkages as ground truths.

Due to the generally small sample set of changes that are explicitly mentioned in incident data, the link discovery module 120 utilizes additional techniques to link changes with incidents in the absence of explicit mentions. Additional CH→IN links defined or discovered using such techniques may be compared against the ground truths to check for accuracy as discussed above.

Although changes that did not lead to incidents are generally more common than changes that led to incidents, identifying changes that did not lead to incidents is a difficult task. Historical change and incident data analysis shows that it is not uncommon for an incident to be caused by a change that was implemented several weeks ago or before other changes that more closely precede the incident, such as the example shown in FIG. 3. As a result, a seemingly successful change that happened a month ago may be the cause that should be linked to an incident. To establish a non-incident-causing changes data set, certain rules may be used. For example, in some embodiments a given change may be classified as non-incident-causing if no incidents occurred after the given change for 30 days or some other defined time period. As another example, in some embodiments a given change may be classified as non-incident-causing if it is marked as successful or if it is not mentioned anywhere as causing an incident. In some embodiments, combinations of one or more of these and other rules may be used to establish the non-incident-causing change data set.

In order for the link discovery module 120 to determine contributing dimensions for incidents, test cases may be prepared. FIG. 7 shows tables 702, 704, 706 and 708 built using 100 incidents from a ground truth set, which comprises incidents caused by changes. To fill out the test set, all changes within the four weeks prior to the 100 incidents are used as candidates to test for contributing dimensions, including the changes that caused the incidents (true targets) as well as other changes implemented within the last four weeks of the incidents (false targets). The link discovery module 120 need not utilize only 100 incidents. Instead, more generally the link discovery module 120 may use all or some subset of the defined linkages stored in SMDB 104.

Time is one dimension to consider for determining potential causality between change and incident data. It may seem intuitive to assume that a change that led to an incident was implemented shortly before the incident. However, an analysis of (CH→IN) pairs in the test data set described above indicate that only 3% of the time the incident took place within an hour of when the offending change was implemented and only 11% of the time was the offending change implemented within one day of the incident. At the same time, in the test data set, analysis revealed that among (CH→IN) pairs that happen within the same day, the change closest to the incident is almost always the offending change.

To test the significance of time in linking CH→IN, the test data set was run with an algorithm with the heuristic that the change closest to the incident is the change that caused the incident. The predictions were then ranked by confidence and compared against the ground truths. The accuracy for correctly identifying the change that caused the incident within the top 5 ranked results as well as the accuracy for the top result are shown in table 702 of FIG. 7. With this approach, the correct change causing the incident appeared in the top 5 52% of the time, and the top ranking prediction was correct 30% of the time. These findings are supported by the earlier analysis that only a small percentage of incidents were caused by changes implemented within a few hours or days before the incidents. This analysis also shows that the same holds true for all incidents and time frames, e.g., even for an incident Y happening two weeks after change X, and with no other changes in between, one can still not reliably determine based on time alone that change X caused incident Y.

Table 704 shows a similar analysis using the above-mentioned example dimensions of Time, SameCI, SameType, SameGroup, SameImpact, SameEntityAction and NumberCommonWords (collectively referred to as "all dimensions" in the context of the tables in FIG. 7). An algorithm was run on the test data to rank the preceding changes according to the number of dimensions that matched against the change, with the hypothesis that more dimensions matched between the (CH, IN) pair under consideration the more likely it is that the (CH, IN) pair is a CH→IN pair. The predictions are then ranked by confidence and compared against the ground truths. As shown in table 705, the accuracy for correctly identifying the change that caused the incident within the top 5 ranked results was 67% and 51% of the time the top ranking prediction was the change causing the incident. Thus, table 704 shows that using all dimensions provides a major improvement over time alone for the test data set. For other test data sets, however, this conclusion may not hold.

While the use of all dimensions as shown in table 704 helps with determining CH→IN pairs, it is still not always clear which of the dimensions provide what contribution. For example, when examining the dimensions to determine CH→IN pairs, it is possible to find pairs that have the same confidence score but in reality only one led to the incident.

In order to determine which dimensions are significant, the link discovery module 120 may utilize probability distributions across two sets, a first set of changes that led to incidents and a second set of changes that did not lead to incidents, CH→IN and CH→NIN, respectively. Single-variable Kolmogorov-Smirnov (KS) statistics are used to see if there is a statistically significant difference between the two distributions of data. The bigger the averaged KS-statistic is, the more informative the dimension is in linking changes to incidents. If there is no significant difference between the CH→IN and CH→NIN groups, the dimension is not informative. Table 706 shows two frequency distributions for 847 (CH→IN and CH→NIN) pairs for the SameEntityAction dimension, which was not significant.

For the test data, KS-statistics revealed that only the SameGroup and NumberofCommonWords dimensions were significant. However, for other test data sets different dimensions may be determined to be significant. Based on these findings, however, the test data was rerun with these two dimensions, referred to in the context of FIG. 7 as "significant dimensions." The predictions were then ranked by confidence and compared against ground truths. Table 708 tabulates the results for time, all dimensions and the significant dimensions for the test data set. As shown, using significant dimensions the correct change causing an incident occurred in the top 5 75% of the time, and 58% of the time the top ranking prediction was the change causing the incident.

In other embodiments, statistical techniques other than KS-statistics may be utilized for determining statistically significant differences. In addition, the particular numbers in the tables of FIG. 7 hold true for the test data set used, but may vary for other change and incident data sets. Nonetheless, FIG. 7 illustrates how the link discovery module 120 can determine contributing dimensions given change and incident data. Various conclusions drawn from the test data set used to generate the tables in FIG. 7 are described below. Again, however, it is important to note that for other data sets different conclusions may be drawn.

Figure 8:
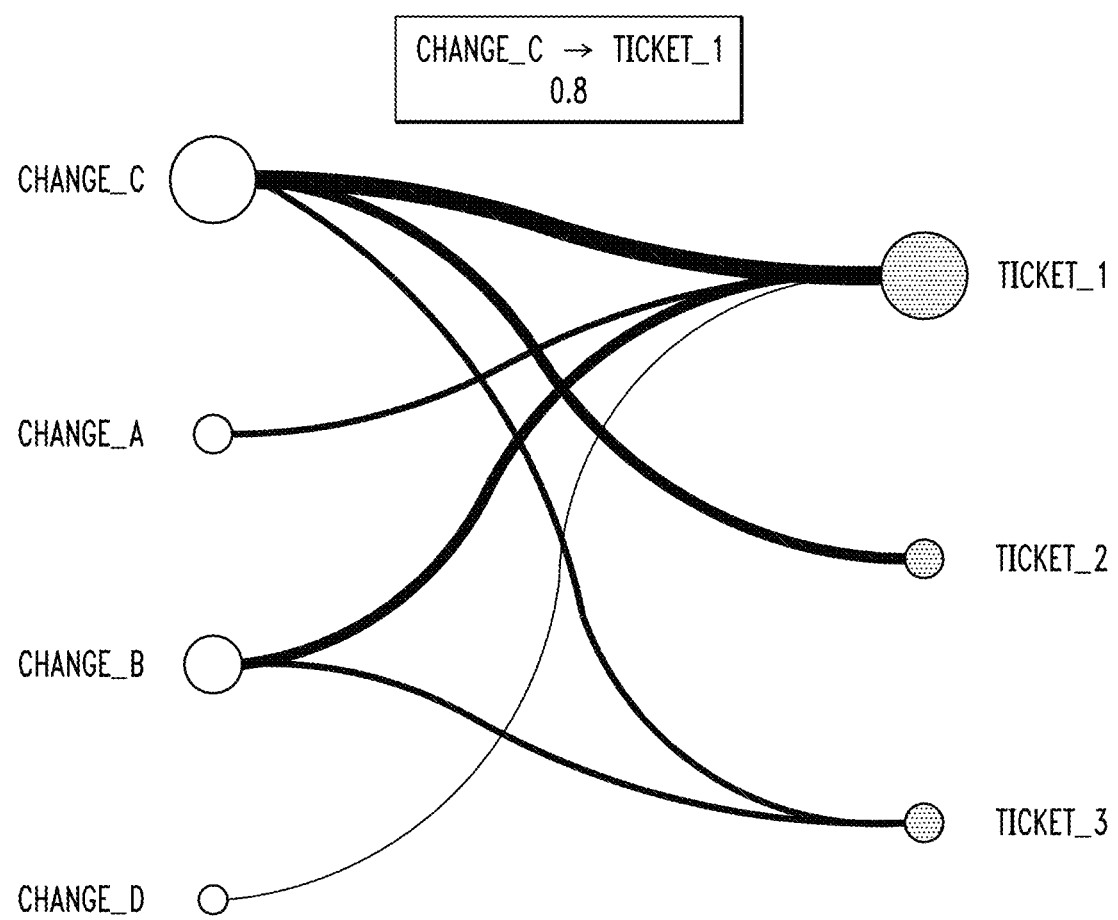
FIG. 8 depicts a graph showing probabilities for mapping changes to incidents, according to an embodiment of the present invention.

The results from the test data used in generating the FIG. 7 tables show that time does not prove to be the best indicator of CH→IN linkage. The SameGroup and NumberofCommonWords dimensions provided greater accuracy for connecting incidents and changes for the specific test data set used. FIG. 8 shows pair predictions 800. As shown in FIG. 8, Change_C is the top ranked prediction for the incident Ticket_1, and Change_A, Change_B and Change_D are other predicted changes within the top 4 ranked list. The sizes of the circles representing the changes indicate their respective ranks within the top 4 list. Similarly, the thickness of the lines connecting the changes and incident tickets are indicative of rank.

Although guaranteeing 1:1 CH→IN linkage may not always be possible, the link discovery module 120 may nonetheless gain valuable insight for use in defining linkages between incidents and changes. Instead of having to manually examine all potential changes preceding an incident, embodiments can narrow down possibilities to only a few changes, such as 3-5 potential changes to consider, with reasonable confidence that the change is in the top ranked 3-5 potential changes. This is useful in problem determination as well as for building a data set for predictive modeling.

The predictive model, also referred to herein as a risk assessment model, may be used to predict whether a change is likely to cause an incident at change creation time. The predictive model may be adapted over time as more CH→IN pairs are discovered or defined.

Figure 9:
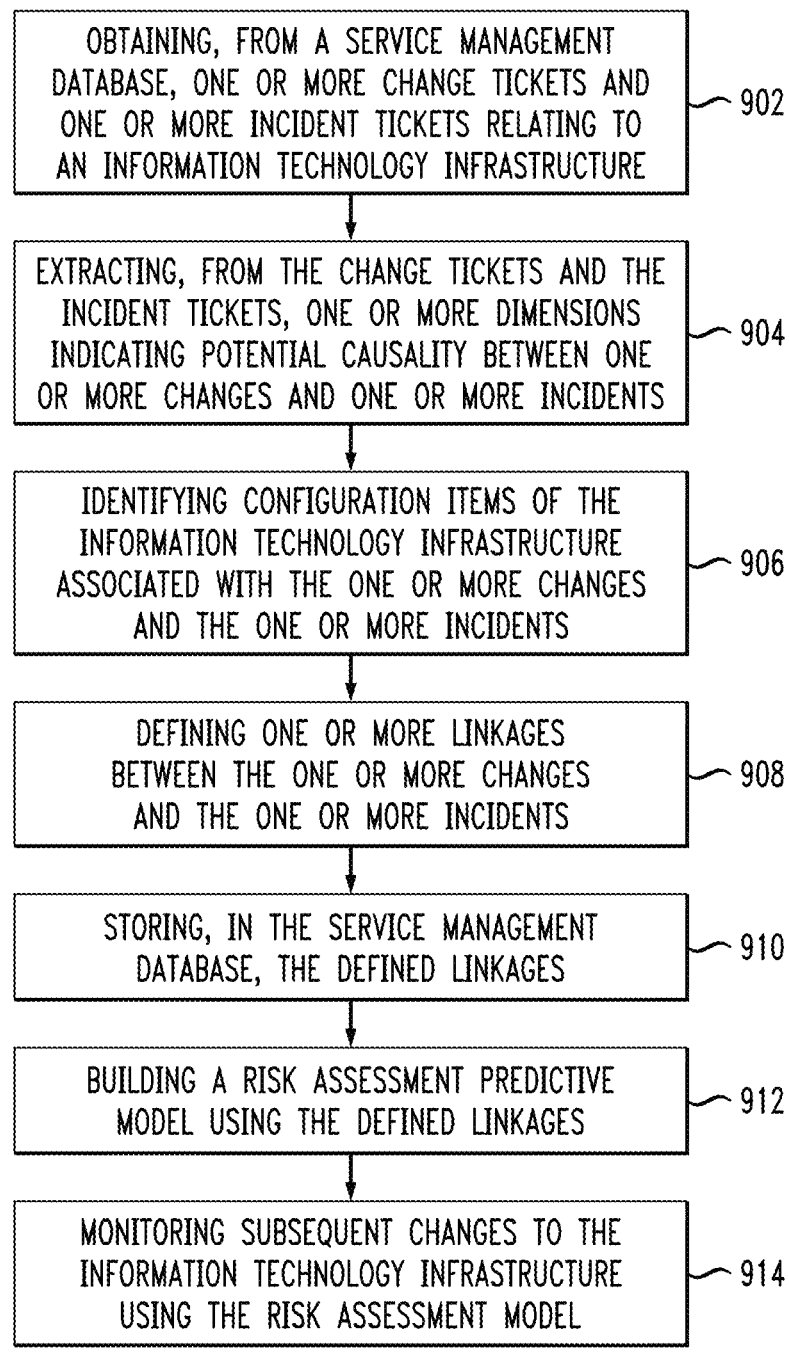
FIG. 9 depicts a process for defining linkages between changes and incidents for configuration items in information technology infrastructure, according to an embodiment of the present invention.

FIG. 9 shows a process 900 for defining linkages between changes and incidents in an IT infrastructure, such as IT infrastructure 106 as well as real-time monitoring of changes to CIs in the IT infrastructure. The process 900 may be performed by service management system 102 utilizing link discovery module 120 and real-time risk assessment module 122. Although the process 900 is described below in the context of the FIG. 1 system, the process 900 may be performed by other types of systems in other embodiments.

The process 900 begins with step 902, obtaining one or more change tickets and one or more incident tickets relating to IT infrastructure 106 from SMDB 104. Step 902 may also include obtaining configuration data for CIs from CMDB 105. In step 904, one or more dimensions indicating potential causality between one or more changes and one or more incidents are extracted from the change tickets and the incident tickets.

In step 906, the CIs in the IT infrastructure 104 associated with the one or more changes and the one or more incidents are identified. Linkages between the one or more changes and the one or more incidents are defined in step 908. The defined linkages are then stored in SMDB 104 in step 910. In some embodiments, the defined linkages are stored in CMDB 105 instead of or in addition to being stored in SMDB 104.

A risk assessment model is built using the defined linkages in step 912, and the risk assessment model is utilized in step 914 to monitor subsequent changes to CIs in the IT infrastructure 106. The steps 902 through 910 may be performed by link discovery module 120 while steps 912 and 914 are performed by real-time risk assessment module 122.

In some embodiments, step 914 further includes identifying one or more of the CIs that are affected by respective ones of the subsequent changes to the IT infrastructure 106 using the risk assessment model. Certain ones of the subsequent changes may be marked as problematic or non-problematic using the risk assessment model. Monitoring the subsequent changes in some embodiments also includes modifying or altering the application of a given subsequent change to a given CI in the IT infrastructure 106. For example, the real-time risk assessment module 122 may be configured to interact with application programming interfaces (APIs) or otherwise communicate with CIs of the IT infrastructure 106 so as to modify whether a given subsequent change is implemented at all, or to change how the given subsequent change is implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
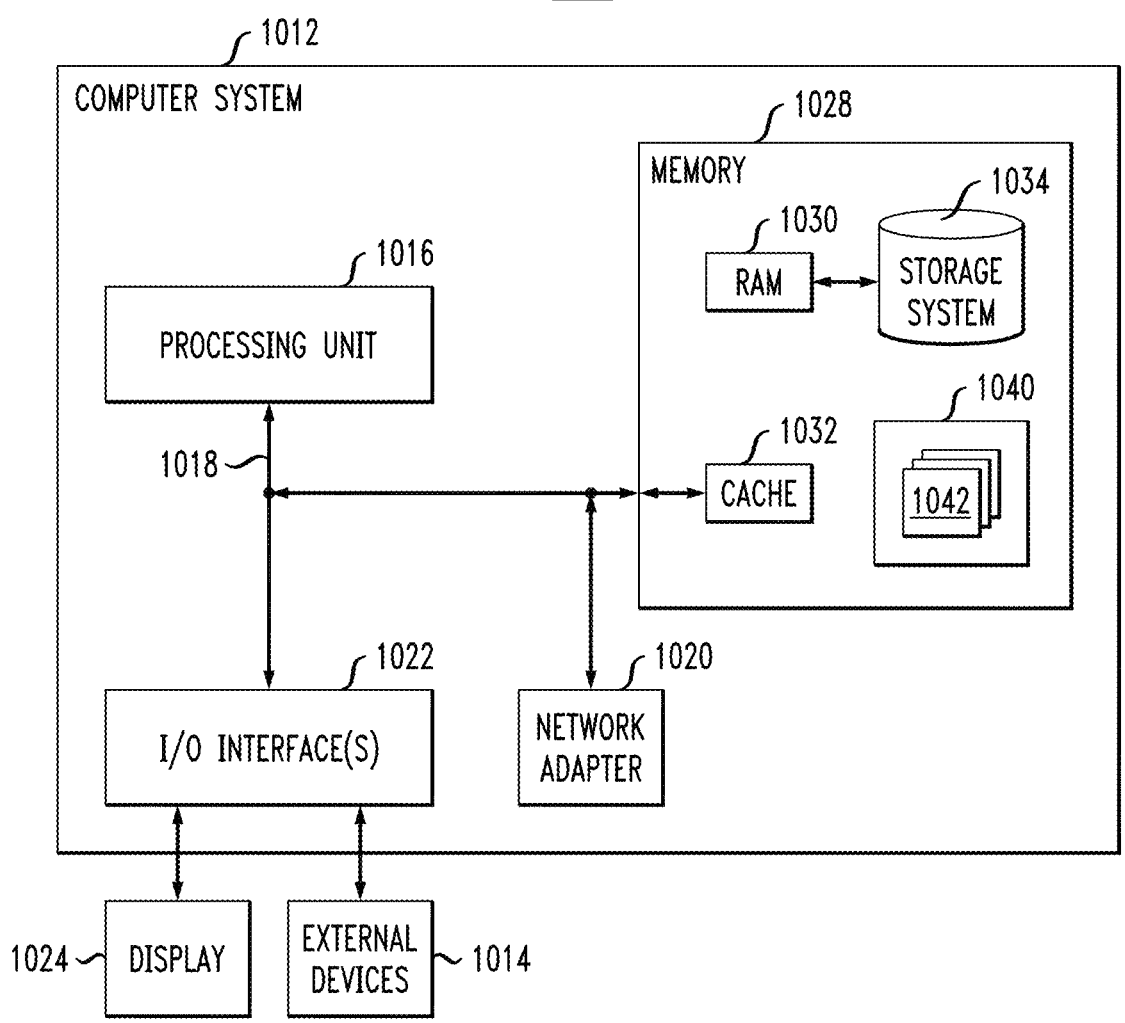
FIG. 10 depicts a computer system in accordance with which one or more components/steps of techniques of the invention may be implemented, according to an embodiment of the present invention.

One or more embodiments can make use of software running on a general-purpose computer or workstation. With reference to FIG. 10, in a computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

The bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1012 typically includes a variety of computer system readable media. Such media may be any available media that is accessible by computer system/server 1012, and it includes both volatile and non-volatile media, removable and non-removable media.

The system memory 1028 can include computer system readable media in the form of volatile memory, such as random access memory (RAM) 1030 and/or cache memory 1032. The computer system/server 1012 may further include other removable/non-removable, volatile/nonvolatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1018 by one or more data media interfaces. As depicted and described herein, the memory 1028 may include at least one program product having a set (e.g., at least one) of program modules that are configured to carry out the functions of embodiments of the invention. A program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc., one or more devices that enable a user to interact with computer system/server 1012, and/or any devices (e.g., network card, modem, etc.) that enable computer system/server 1012 to communicate with one or more other computing devices. Such communication can occur via I/O interfaces 1022. Still yet, computer system/server 1012 can communicate with one or more networks such as a LAN, a general WAN, and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples include, but are not limited to, microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
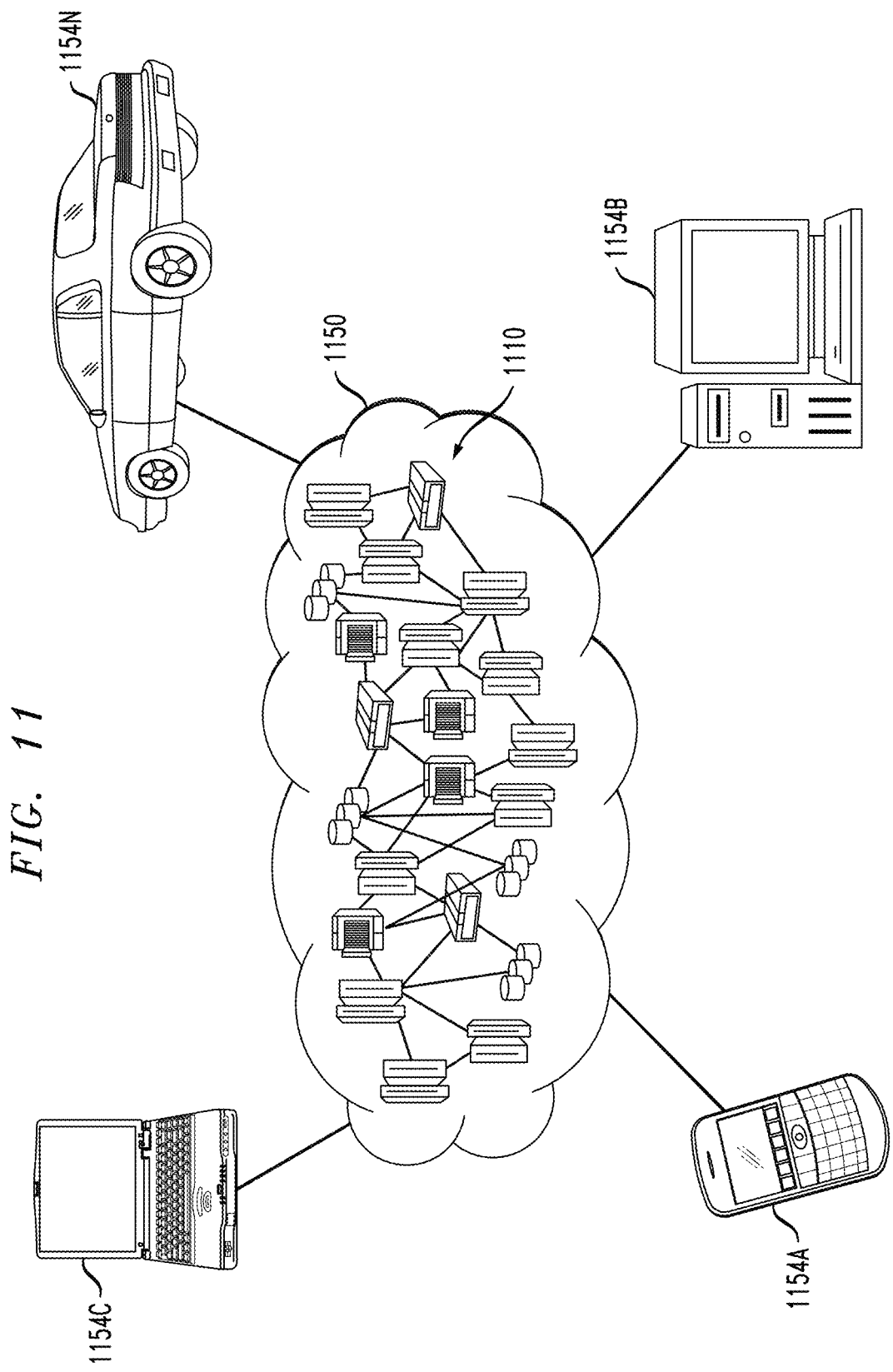
FIG. 11 depicts a cloud computing environment, according to an embodiment of the present invention.

Referring now to FIG. 11, illustrative cloud computing environment 1150 is depicted. As shown, cloud computing environment 1150 comprises one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
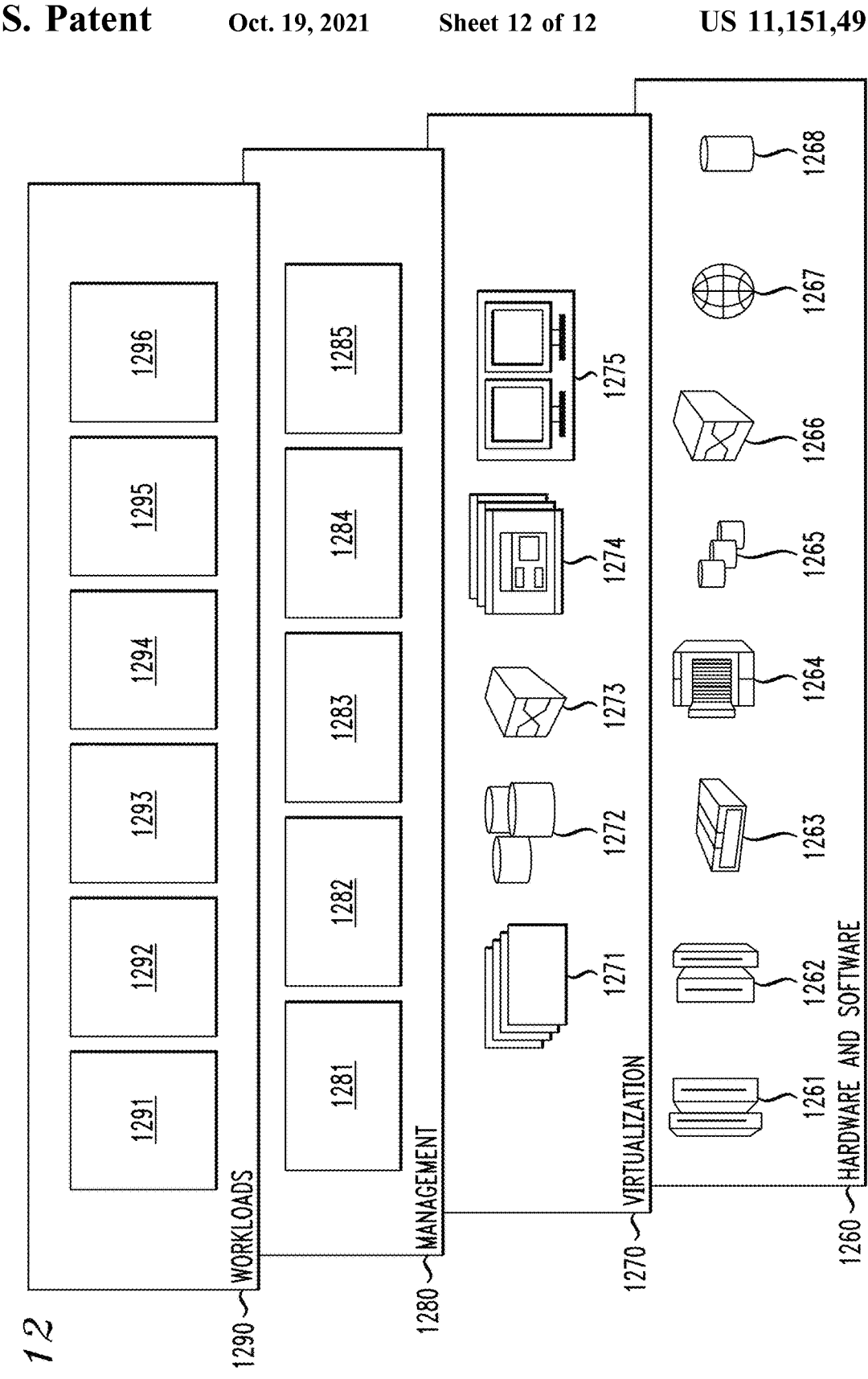
FIG. 12 depicts abstraction model layers, according to an embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 71282 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and change monitoring 1296, which may perform one or more of the functions described above for defining linkages between changes and incidents as well as monitoring changes to CIs in IT infrastructure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
    obtaining, from a service management database, one or more change tickets and one or more incident tickets relating to an information technology infrastructure;
    extracting, from the change tickets and the incident tickets, a plurality of dimensions;
    generating a first probability distribution of changes that led to incidents for each of the plurality of dimensions;
    generating a second probability distribution of changes that did not lead to incidents for each of the plurality of dimensions;
    determining, for each of the plurality of dimensions, a difference between the first probability distribution and the second probability distribution;
    selecting a subset of the plurality of dimensions as one or more dimensions indicating potential causality between one or more changes and one or more incidents based at least in part on the determined differences between the first probability distributions and the second probability distributions;
    identifying configuration items of the information technology infrastructure associated with the one or more changes and the one or more incidents;
    defining one or more linkages between the one or more changes and the one or more incidents;
    storing, in the service management database, the defined linkages;
    building a risk assessment model using the defined linkages;
    monitoring subsequent changes to configuration items in the information technology infrastructure using the risk assessment model; and
    altering application of a given subsequent change to modify operation of a given configuration item in the information technology infrastructure responsive to said monitoring to reduce a probability of the given subsequent change leading to an incident in the information technology infrastructure;
    wherein the method is performed by at least one processing device coupled to the information technology infrastructure over at least one network.

2. The method of claim 1 wherein the configuration items in the information technology infrastructure comprise one or more servers, databases, middleware, software and business applications.

3. The method of claim 1 wherein the change tickets comprises one or more structured fields comprising at least one of: a start time; a priority; a type; and an owner group.

4. The method of claim 1 wherein the incident tickets comprises one or more structured fields comprising at least one of: a start time; a severity; a type; and a resolver group.

5. The method of claim 1 wherein the change tickets and the incident tickets comprise one or more unstructured fields comprising at least one of: a summary; a detailed description; and a resolution.

6. The method of claim 1 wherein the plurality of dimensions comprises at least one temporal dimension.

7. The method of claim 1 wherein the plurality of dimensions comprises at least one of an owner group, a type and a priority extracted from one or more structured fields of the change tickets and the incident tickets.

8. The method of claim 1 wherein the plurality of dimensions comprises at least one entity-action pair extracted from one or more unstructured fields of the change tickets and the incident tickets.

9. The method of claim 1 wherein defining one or more linkages comprises:
    determining one or more ground truths, the ground truths comprising known change-incident pairs explicitly mentioned in the incident tickets;
    discovering one or more potential change-incident pairs by comparing dimensions of the change tickets and the incident tickets; and
    comparing the potential change-incident pairs with the one or more ground truths.

10. The method of claim 9 wherein discovering the one or more potential change-incident pairs comprises:

scanning text in the change tickets and the incident tickets to identify one or more configuration items;

identifying entity-action pairs using part-of-speech tags and parse dependencies;

checking for common words between the change tickets and the incident tickets;

verifying that start times of respective changes in the potential change-incident pairs occurred within a designated period of time prior to the corresponding incident; and comparing similarity between extracted dimensions and identified configuration items for respective change-incident pairs.

11. The method of claim 10, wherein identifying entity-action pairs comprises: identifying nouns and verbs in the change tickets and the incident tickets; mapping the nouns to one or more entities and the verbs to one or more actions; and relating pairs of nouns and verbs as entity-action pairs when the nouns and verbs co-occur within one or more fields of one or more of the change tickets and the incident tickets.

12. The method of claim 1 wherein identifying configuration items comprises: for each configuration item, identifying one or more keys, each key comprising information uniquely identifying that configuration item; and matching keys to text in one or more of the change tickets and the incident tickets.

13. The method of claim 1 wherein selecting the subset of the plurality of dimensions as the one or more dimensions indicating potential causality between one or more changes and one or more incidences comprises selecting a given one of the plurality of dimensions for inclusion in the subset responsive to determining that there is a statistically significant difference between the first probability distribution and the second probability distribution for the given dimension utilizing Kolmogorov-Smirnov (KS) statistics.

14. The method of claim 1 further comprising identifying one or more of the configuration items affected by the one or more subsequent changes utilizing the risk assessment model.

15. The method of claim 1 further comprising marking one or more of the subsequent changes as non-problematic changes utilizing the risk assessment model.

16. The method of claim 1 wherein altering application of the given subsequent change to modify operation of the given configuration item comprises refraining from implementing the given subsequent change to the given configuration item.

17. A computer program product comprising a non-transitory computer readable storage medium for storing computer readable program code which, when executed by a processing device, causes the processing device:

to obtain, from a service management database, one or more change tickets and one or more incident tickets relating to an information technology infrastructure;

to extract, from the change tickets and the incident tickets, a plurality of dimensions;

to generate a first probability distribution of changes that led to incidents for each of the plurality of dimensions;

to generate a second probability distribution of changes that did not lead to incidents for each of the plurality of dimensions;

to determine, for each of the plurality of dimensions, a difference between the first probability distribution and the second probability distribution;

to select a subset of the plurality of dimensions as one or more dimensions indicating potential causality between one or more changes and one or more incidents based at least in part on the determined differences between the first probability distributions and the second probability distributions;

to identify configuration items of the information technology infrastructure associated with the one or more changes and the one or more incidents;

to define one or more linkages between the one or more changes and the one or more incidents;

to store, in the service management database, the defined linkages;

to build a risk assessment model using the defined linkages;

to monitor subsequent changes to configuration items in the information technology infrastructure using the risk assessment model; and to alter application of a given subsequent change to modify operation of a given configuration item in the information technology infrastructure responsive to said monitoring to reduce a probability of the given subsequent change leading to an incident in the information technology infrastructure;

wherein the computer is coupled to the information technology infrastructure over at least one network.

18. The computer program product of claim 17, wherein selecting the subset of the plurality of dimensions as the one or more dimensions indicating potential causality between one or more changes and one or more incidences comprises selecting a given one of the plurality of dimensions for inclusion in the subset responsive to determining that there is a statistically significant difference between the first probability distribution and the second probability distribution for the given dimension utilizing Kolmogorov-Smirnov (KS) statistics.

19. An apparatus comprising:

a processing device comprising a processor coupled to a memory;

the processing device being configured:

to obtain, from a service management database, one or more change tickets and one or more incident tickets relating to an information technology infrastructure;

to extract, from the change tickets and the incident tickets, a plurality of dimensions;

to generate a first probability distribution of changes that led to incidents for each of the plurality of dimensions;

to generate a second probability distribution of changes that did not lead to incidents for each of the plurality of dimensions;

to determine, for each of the plurality of dimensions, a difference between the first probability distribution and the second probability distribution;

to select a subset of the plurality of dimensions as one or more dimensions indicating potential causality between one or more changes and one or more incidents based at least in part on the determined differences between the first probability distributions and the second probability distributions;

to identify configuration items of the information technology infrastructure associated with the one or more changes and the one or more incidents;

to define one or more linkages between the one or more changes and the one or more incidents;

to store, in the service management database, the defined linkages;

to build a risk assessment model using the defined linkages;

to monitor subsequent changes to configuration items in the information technology infrastructure using the risk assessment model; and to alter application of a given subsequent change to modify operation of a given configuration item in the information technology infrastructure responsive to said monitoring to reduce a probability of the given subsequent change leading to an incident in the information technology infrastructure;

wherein the processing device is coupled to the information technology infrastructure over at least one network.

20. The apparatus of claim 19, wherein selecting the subset of the plurality of dimensions as the one or more dimensions indicating potential causality between one or more changes and one or more incidences comprises selecting a given one of the plurality of dimensions for inclusion in the subset responsive to determining that there is a statistically significant difference between the first probability distribution and the second probability distribution for the given dimension utilizing Kolmogorov-Smirnov (KS) statistics.

\* \* \* \* \*